(12) United States Patent
Shiigi

(10) Patent No.: US 6,564,249 B2
(45) Date of Patent: *May 13, 2003

(54) METHOD AND SYSTEM FOR CREATING AND SENDING HANDWRITTEN OR HANDDRAWN MESSAGES

(75) Inventor: Clyde K. Shiigi, Aiea, HI (US)

(73) Assignee: DH Labs, Inc., Honolulu, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/978,472

(22) Filed: Oct. 15, 2001

(65) Prior Publication Data

US 2002/0046249 A1 Apr. 18, 2002

Related U.S. Application Data

(63) Continuation-in-part of application No. 09/687,351, filed on Oct. 11, 2000, now Pat. No. 6,304,898.
(60) Provisional application No. 60/159,636, filed on Oct. 13, 1999.

(51) Int. Cl.[7] ................................................ G06F 13/00
(52) U.S. Cl. ...................... 709/206; 709/219; 709/321; 709/328
(58) Field of Search ................................. 709/203, 206, 709/217, 219, 313, 328, 329, 321

(56) References Cited

U.S. PATENT DOCUMENTS

| | | | |
|---|---|---|---|
| 5,418,713 A | | 5/1995 | Allen |
| 5,426,594 A | | 6/1995 | Wright et al. |
| 5,546,539 A | * | 8/1996 | Cobbley et al. ............ 709/203 |
| 5,960,412 A | | 9/1999 | Tackbary et al. |
| 6,198,809 B1 | * | 3/2001 | Disanto et al. .......... 379/93.23 |
| 6,212,535 B1 | * | 4/2001 | Weikart et al. ............. 707/513 |
| 6,396,481 B1 | * | 5/2002 | Challa et al. ............... 345/169 |

FOREIGN PATENT DOCUMENTS

| | | |
|---|---|---|
| EP | 0 784 394 A | 7/1997 |
| GB | 2289555 A | 11/1995 |
| WO | WO 97/04578 A | 2/1997 |
| WO | WO 00/02149 A | 1/2000 |

* cited by examiner

Primary Examiner—Viet D. Vu
(74) Attorney, Agent, or Firm—Leighton K. Chong; Ostrager Chong & Flaherty (Hawaii)

(57) ABSTRACT

A real-time electronic messaging system, and related method, employs a remote client device with a handwriting client component that sets up a graphical data capture area in the device visual interface and employs a graphical input device for allowing a sender to input a handwritten or handdrawn message. The handwriting client component captures the handwritten or handdrawn input, converts it to an electronic message, and sends it online to a recipient. The remote client device is connected online via a network to a real-time messaging server which sends the message to the remote client device for the recipient. In preferred versions, the remote client device can be a wireless PDA, always-on pager or messaging device, or mobile phone with SMS or EMS service.

20 Claims, 11 Drawing Sheets

Handwriting Client and Real Time Server Version

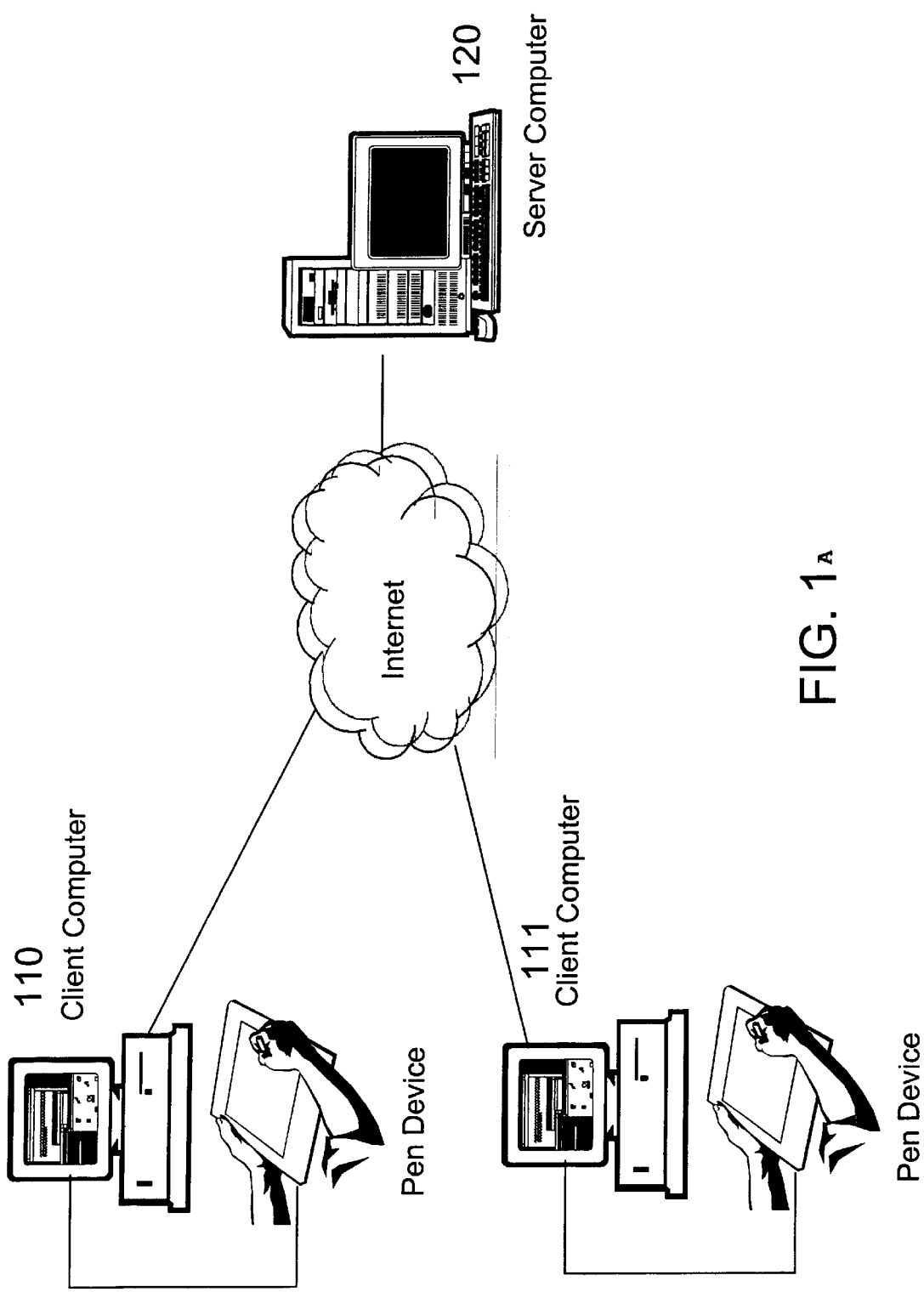

Handwriting Client and Handwriting Server Version

Handwriting Client and Handwriting Server Version

Handwriting Applet and Domino Server Version

Handwriting Client and Domino Server Version

Handwriting Applet and Real Time Server Version

Handwriting Client and Real Time Server Version

Handwriting Applet and Mail Server Version (Handwriting Client and Wireless Internet Email)

METHOD AND SYSTEM FOR CREATING AND SENDING HANDWRITTEN OR HANDDRAWN MESSAGES

This U.S. patent application claims the priority of U.S. Provisional Application No. 60/159,636 filed on Oct. 13, 1999, entitled "Graphical Email Drawing and File Attachment System", and is a continuation-in-part of U.S. patent application Ser. No. 09/687,351, filed on Oct. 11, 2000, entitled "Method and System for Creating and Sending Graphical Email", by the same inventor, now U.S. Pat. No. 6,304,898.

FIELD OF THE INVENTION

This invention relates generally to the processing of handwritten content as digital data in electronic messaging, and specifically to an electronic messaging system for graphical (handwritten or handdrawn) email.

BACKGROUND OF THE INVENTION

Electronic messaging is a general method for sending and receiving communications as digital data between computers on a network. The Internet has dramatically increased electronic messaging amongst millions of users on global data networks. Many different forms of electronic messaging are being used to send and receive communications in a wide variety of forms of structured and unstructured data. Businesses make extensive use of electronic messaging to conduct business communications and transactions between trading partners. Electronic mail (or email) is a popular form of electronic messaging for communications between users. Typical email messages are composed of typed text or a combination of typed text and text or graphical files that are attached to the email message and opened with the appropriate processor or viewer. As the popularity of the Internet continues to grow worldwide, more and more people numbering in the billions are expected to use email for communications.

Recent advances in technology and standards have expanded the types and forms of devices that can connect to the Internet. In addition to dial-up and online connections between users computers and servers that provide information services and email services, many types of other devices are being connected to the Internet for communications purposes, including personal digital assistants (PDAs), text messaging pagers, digital cellphones enabled with Wireless Application Protocol (WAP), advanced digital game machines, digital set top boxes for televisions, and even CPU-controlled household appliances. Many of these devices having Internet access do not require or are not adapted to use a keyboard for inputting data. While there are other types of input devices that enable handwritten or handdrawn input, such as touch sensitive screens, stylus pads, optical pens, etc., they have not been enabled for electronic messaging and other communication functions.

Handwritten or handdrawn input can be more convenient to use than a keyboard and, in many situations, would be uniquely necessary for certain types of communication. Many written language systems, such as Japanese, Korean, Chinese, Arabic, Thai, Sanskrit, etc., use cursive or ideographic characters that are very difficult to input by an equivalent method via keyboard. For example, text input of the Japanese written language requires the use of simulated phonetic spelling methods (romanji, hiragana, and/or katakana) to select from thousands of possible kanji characters. Many mobile devices such as PDAs do not have keyboards due to their limited size and form, or would become cumbersome to use if a keyboard must be attached or if text must be entered by cursoring through displays of softkeys. Disabled or hospitalized people who have limited hand mobility may not be able to use a keyboard effectively. Current legal and financial institutions still rely heavily on the use of handwritten signatures to validate a person's unique identity. And in many instances, people find it much easier to communicate an idea by drawing a picture, or prefer handwriting or drawing a picture as more personal or expressive communication than typing text on a keyboard.

There is thus a clear need for an electronic messaging system that allows people to communicate with their own handwriting or drawing, as contrasted to typed text. This need will continue to grow as the numbers of global users and Internet-connected devices increase. None of the current electronic messaging methods allow a user to compose, manipulate, store, send, receive, and view a handwritten or handdrawn email message.

SUMMARY OF THE INVENTION

In accordance with the present invention, an electronic messaging system, and related method, comprises a handwriting server component operable on a server computer on a network with an email host server for receiving an email message sent from a user and storing it for retrieval by a user to whom it is addressed, and a handwriting client component operable with an email client on a client computer for setting up a graphical data capture area into which a user can enter handwritten or handdrawn input through a suitable graphical input device, and for capturing the handwritten or handdrawn input as graphical data and sending it via the network to the server component for handling as an email message. The client component is also operable for setting up a graphical data viewing area for viewing the graphical data sent with an email message handled by the server component.

In another version of the invention, an electronic messaging device, and related method, comprises a handwriting messaging component operable in a web browser of a computer connected on a network for setting up a graphical data capture area into which a user can enter handwritten or handdrawn input through a suitable graphical input device, and for capturing the handwritten or handdrawn input as graphical data and sending it as an email message on the network. The handwriting messaging component can convert the graphical data to a GIF file that is attached to the email message and send the email message to a standard Internet email server. Alternatively, the handwriting messaging component can format the captured data as pixel data and send it to a handwriting server component of a server computer that can transmit it to a receiving computer enabled with a similar handwriting messaging component for retrieving the email message and viewing the pixel data as the corresponding handwritten or handdrawn image.

In the preferred embodiments, the handwriting messaging component is a Java applet downloadable to a web page for an email client of a standard web browser, or may be a Java plug-in application installed with the web browser. The graphical input device can be a touch screen, pen input device, stylus pad, or even a standard mouse. The handwriting messaging component sets up a drawing editor/viewer that allows the user to compose, manipulate, and view handwritten or handdrawn messages. The editor/viewer can include standard drawing tools such as those for line size, color, paper and border selection, circle and polygon shapes, spray paint, flood fill, color palette, undo and scrolling functions.

Other objects, features, and advantages of the present invention will be described in further detail below, with reference to the following drawings:

BRIEF DESCRIPTION OF DRAWINGS

FIG. 1A is a diagram illustrating the connection of client computers with pen devices to an email server computer on the Internet.

DETAILED DESCRIPTION OF INVENTION

Figure 1B:
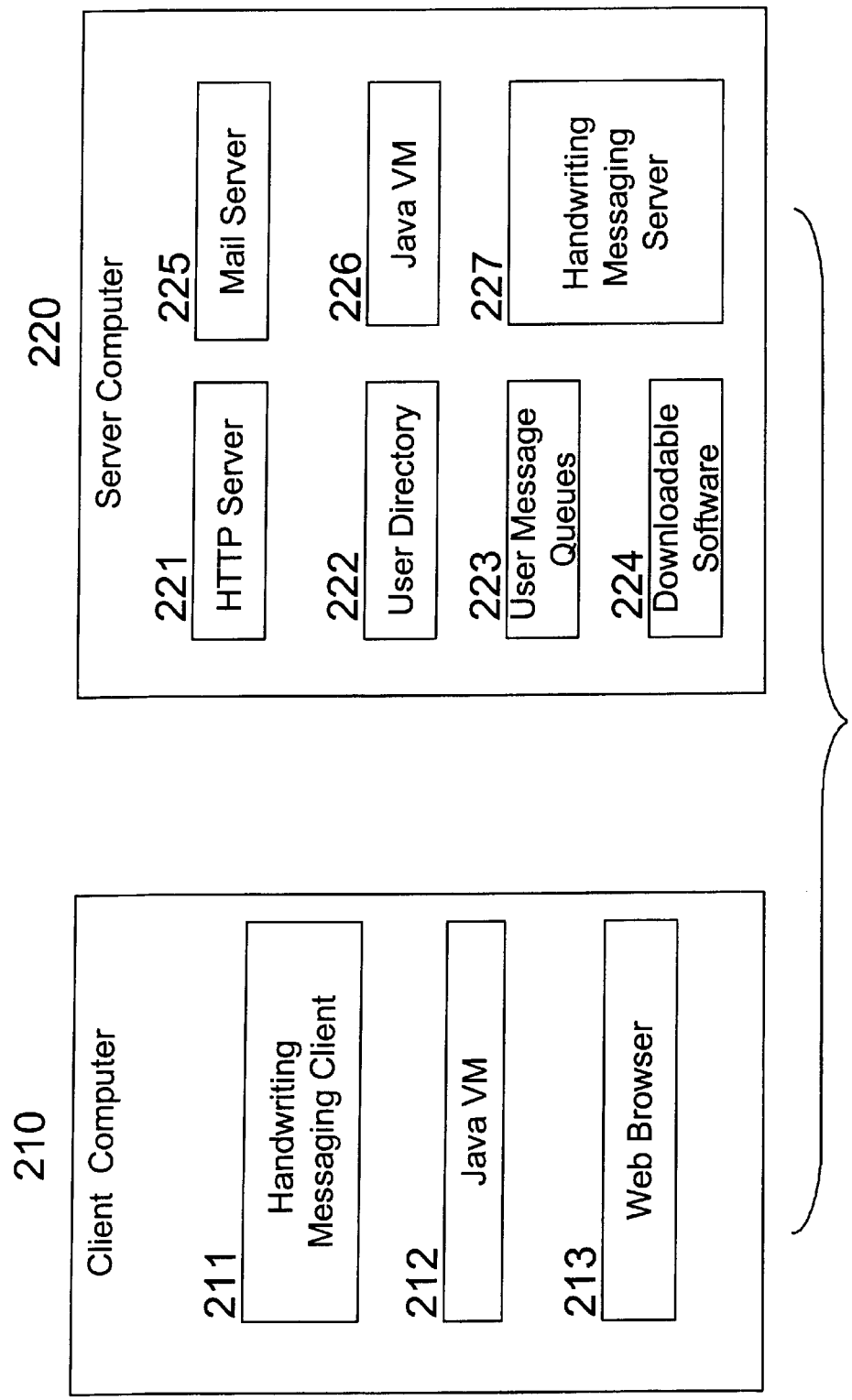
FIG. 1B shows the email handling components of the client and server computers.

Referring to FIG. 1A, the general system architecture of the graphical email system (and related method) of the present invention is illustrated. A plurality of client computers 110, 111, etc., adapted for handwriting or handdrawing input are used by users to connect via a network (the Internet or any type of multi-user network) to a server computer 120. In the context of this description, the term "computer" is used to refer to any type of data processing device which is capable of executing digitally programmed instructions. The term "client computer" refers to any computer capable of connecting to a server computer on a network and performing a function with the server computer. An example of a typical computer for use on a network is a Pentium or higher class PC with Windows operating system of Microsoft Corp., Redmond, Wash., or MacIntosh or higher class PC with MacIntosh OS operating system of Apple Computer Corp., Cupertino, Calif. However, a client computer can also be a wide range of other network-connectable computing devices such as personal digital assistants (PDAs), text messaging pagers, digital cellphones enabled with Wireless Application Protocol (WAP), advanced digital game machines, digital set top boxes for televisions, and even CPU-controlled household appliances. The term "server computer" is used to refer to any type of data processing device that is connected to a node on a network for providing services to client devices on the network.

In the present invention, the client computer 110 is what a sender or recipient uses to compose and send, and receive and view, handwritten or handdrawn email messages. The client computer preferably is of the type that can run a standard web browser which supports an email client, such as those compatible with Microsoft IE 4.x browsers, licensed by Microsoft Corp., of Bellevue, Wash., or Netscape 4.x web browsers, licensed by America Online, Inc., of Fairfax, Va. The standard browsers preferably also support the Java Virtual Machine, Version 1.2 or higher, licensed by Sun Microsystems, of Mountain View, Calif., which is the preferred platform for programming and distributing the handwriting messaging software in the present invention as Java applets or Java-based plug-ins to the browsers. The standard web browsers connect to the network using any standard protocol recognized on the network. For example, on the Internet standard web browsers use the TCP/IP protocol. Connection to the network may be made by modem over a dial-up telephone line, DSL line, cable modem, Internet access connection, or a local area network.

The handwriting or handdrawing input device can be a touch screen, pen input device, stylus pad, optical pointer, mouse, etc., which is attached to the client computer to allow the user to handwrite or handdraw messages in a graphical data capture area of the email client of the web browser set up for that purpose. Examples of such input devices include the Wacom Graphire™ pen tablet sold by Wacom Technology Corporation, of Seattle, Wash., which attaches to the client computer via a serial or USB port. The pen device could also be integrated with a touch screen, e.g., as also offered by Wacom, or part of the computer itself, e.g., as offered with the Sharp SJ5, Copernicus and Pro Stations sold by Sharp Corporation, of Tokyo, Japan.

The server computer 120 is a central processing server for the graphical email system. It is connected to the network to communicate with the client computers using, for example, the TCP/IP protocol on the Internet. In the preferred implementation, the server computer stores the graphical email handling software that is downloaded to the client computers. It authenticates users against a directory of authorized users and manages and tracks the state of concurrent user sessions. For sending and receiving graphical email, it communicates with the graphical email software on the client computers. When a handwriting message is composed on the client computer, the server computer receives the graphical email message and stores it in a database. When a handwriting message is to be viewed by the client computer, the server computer fetches the graphical email message from the database and sends the message to the client computer for display as a handwriting image.

Referring to FIG. 1B, the graphical email handling components of the preferred implementation of the invention system are illustrated. The client computer 210 includes a Handwriting Messaging Client 211 which handles sending and receiving graphical email messages, a Java Virtual Machine (VM) 212 which sets up the graphical data capture area and display area for the handwriting message, and the Web Browser 213 which provides the user interface for connecting to the Internet (or other network). There are two versions of the Handwriting Messaging Client software described below, i.e., a Java applet and a Java application version. The Java applet version is used for sending and receiving handwritten email messages via a server computer's mail server functions. The Java application version of the handwriting messaging client software is installed with the users' browsers for real-time messaging between users or via a real-time Java server. The client software includes a drawing editor/viewer for composing and viewing handwritten email messages, as well as the functions to communicate with a server in a server-client configuration.

The server computer 220 includes an HTTP Server Interface 221 for connection to the Internet, a User Directory 222 for identifying email addresses of authorized users, User Message Queues 223 for delivering received messages to users, a Downloadable Software Server 224 for downloading the graphical email software to client computers, a Mail Server Interface 225 for handling sent and received email, a Java Virtual Machine (VM) 226 which provides the platform for interacting with the users'graphical email software, and a Handwriting Messaging Server 227 which formats email messages using the graphical data captured by the software on the client computers. There are four versions of the Handwriting Messaging Server described below, i.e., a Handwriting Java Server Version, a Domino Server Version, a Real-Time Java Server Version, and an Internet Email Server Version.

Handwriting Java Client and Handwriting Java Server Version

With reference to FIG. 2B, this version of the system uses both handwriting client and server software components along with the usual email server functions. A Handwriting Java Client 210a operates in a web browser (such as Netscape Navigator or Microsoft Internet Explorer) as a Java applet on the client computer 210. The applet 210a provides a drawing editor to compose and send handwritten email messages, and on the receiving end, also provides the drawing viewer to view the handwritten message. The implementation of a Java applet for the handwriting messaging function is described in further detail below. Generally, the use of a Java applet to provide a drawing application intended to run in a browser is known to those knowledgeable in this field. As one example, a Java applet used to set up a drawing editor in a browser for a "whiteboard" application run on an intranet is the SameTime™ whiteboard applet offered with Lotus™ Notes, a workgroup software suite distributed by Lotus Development Corp., of Cambridge, Mass., which is a division of IBM Corp., Armonk, N.Y.

In the present invention, a Java applet is created specifically for setting up a drawing editor/viewer operable with an email client running with a web browser for capturing, sending, receiving and viewing a handwriting or handdrawing email message. The Java applet consists of a set of modules which run the different messaging functions of the drawing editor/viewer. The data capture and sending module operates by first recognizing the handwriting input device connected to the client computer, then creating a temporary memory space for holding the input received from the input device, capturing the input signals from the input device (usually a series of coordinate data inputs representing time-sampled coordinate positions detected for the trace of the input device), converting the input signals to pixel data (screen coordinates, color, intensity), and displaying the pixel data in a display area or "panel" of the email client to show the handwriting or handdrawn image input by the user through the input device. The display allows the user sending a handwritten email message to verify what is being written, and is also the same display that allows a user receiving the handwritten email message to view the corresponding image. An example of a data capture and sending module according to the invention is illustrated in the source code listing appended hereto as Appendix I.

When the graphical email message is completed, the user addresses the message to a recipient and sends it. The Handwriting Java Client formats and sends the email message with the pixel data to the Handwriting Java Server component 220a on the server computer 220, which converts the pixel data to a GIF file attachment to a standard email body. The Handwriting Java Server component 220a communicates with an SMTP email gateway computer 240 to send email messages using the industry-standard SMTP Internet protocol. The SMTP email gateway sends the email messages to mail servers 250, such as an industry-standard IMAP (Internet Message Access Protocol) mail servers like MS Exchange or Lotus Domino on the Internet. Email recipients can retrieve their email from the mail servers 250 using a standard Internet email client 260, such as Microsoft Outlook, Pegasus Mail, Eudora mail, or Lotus Notes. When the graphical email is retrieved with a standard Internet email client, the handwritten drawing is viewed as a file attachment using a GIF viewer operates with the web browser. Email recipients on client computers 230 who have the Handwriting Java Client 210a in their web browser can receive their handwritten email messages directly. The graphical email message is retrieved from the Handwriting Java Server component 220a on the server computer 220 and displayed in the Handwriting Java Client viewer as a handwritten or handdrawn image.

Figure 2A:
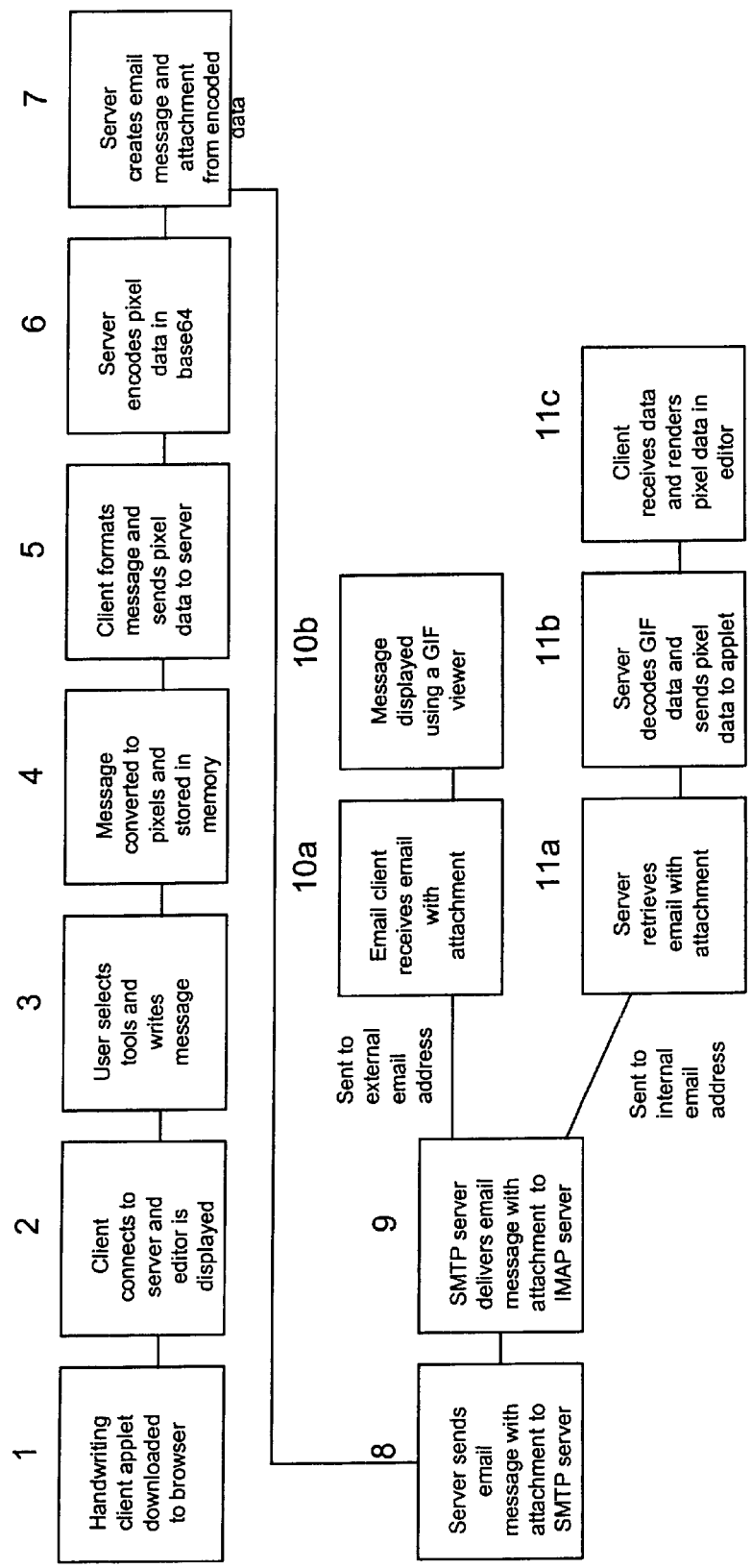
FIG. 2A is a process flow diagram of an SMTP server version of the graphical email system.
Figure 2:
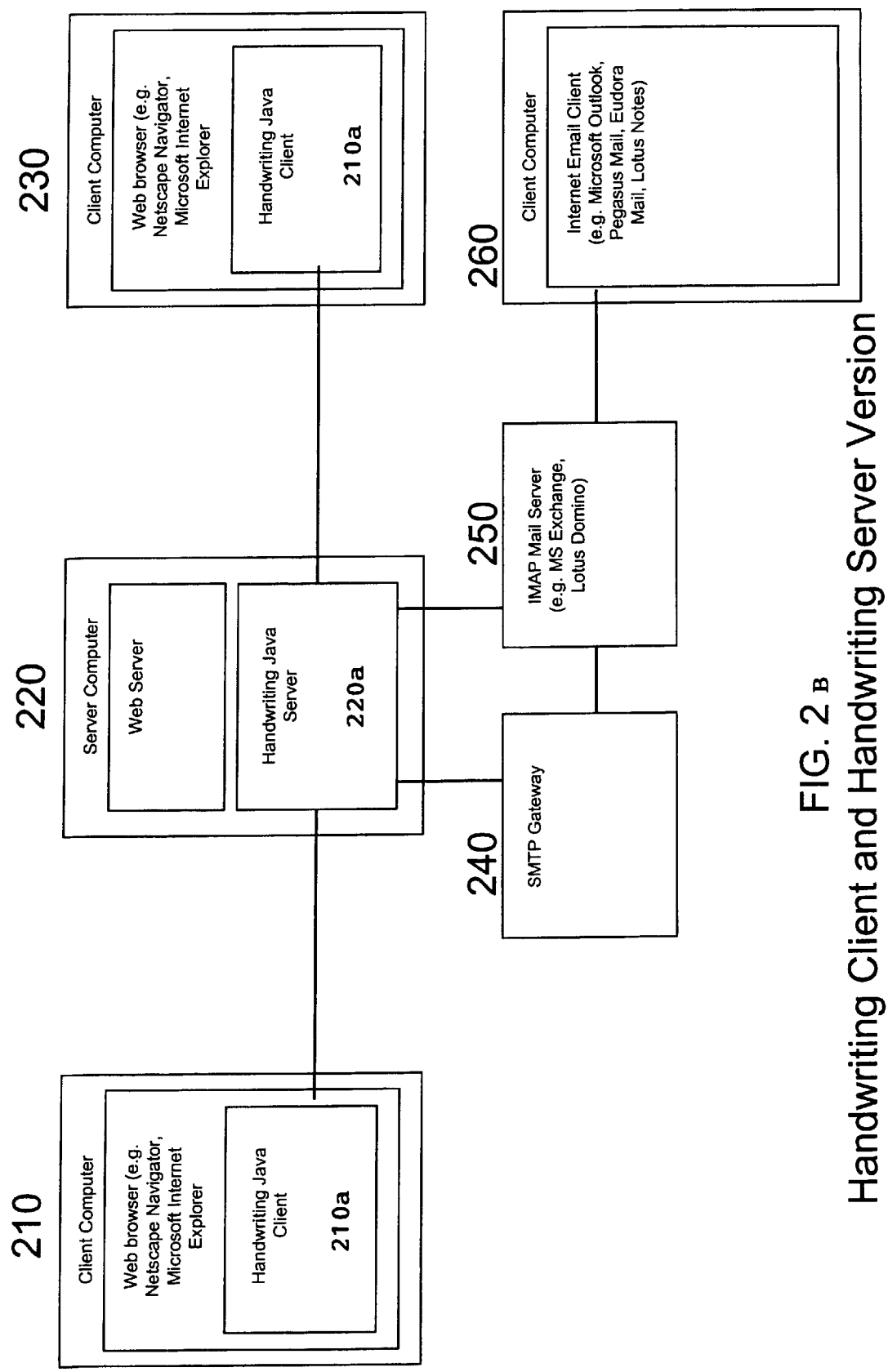
FIG. 2B is a schematic illustration of the network connections of this version of the graphical email system.

With reference to FIG. 2A, the specific process steps involved with sending a handwritten email message and viewing it by the recipient are described in detail below:

1. The Handwriting Java Client software is downloaded from the Handwriting Java Server to the client computer through a web page that is displayed in a web browser.
2. The Handwriting Java Client software is initialized and establishes a connection to the Handwriting Java Server using the industry-standard TCP/IP and remote method invocation (RMI) protocols. After initialization is complete, the Handwriting Java Client software displays a drawing composition editor that is used to compose the handwritten message.
3. The handwritten message is composed by the user in a graphical data capture area set up by the drawing editor, selecting the appropriate writing and drawing tools, colors, and styles as offered in the Handwriting Java Client software.
4. While the user is drawing in the graphical data capture area, the pixel data representing the drawing is stored in local memory. When the graphical email message is completed, the user addresses the message to a recipient using Javascript fields on the web page in which the Java handwriting client is embedded.
5. When the user issues a "Send" command, the Handwriting Java Client formats the message and sends the pixel data to the Handwriting Java Server. The graphical message is still in GIF format at this time.
6. The Handwriting Java Server processes the graphical message data using standard base64 encoding. This turns the data into ASCII text that can be transmitted as standard email data packets by the Handwriting Java Server.
7. The Handwriting Java Server creates an outgoing email message that contains the encoded handwritten message as a GIF attachment.
8. The Handwriting Java Server sends the outgoing email message with GIF attachment via the SMTP (Simple Mail Transfer Protocol) gateway 240.
9. The SMTP gateway transfers the message to an IMAP mail server based on the recipient's address. The IMAP server allows clients running it to retrieve mail from the host mail server also running the protocol, similar to POP-3, but with extended capabilities. Recipients can open the email as a standard email message with a GIF attachment (steps 10a, 10b below) or with a Handwriting Java Client applet if downloaded to their web browser (steps 11a, 11b, 11c below).

10a. The IMAP server sends the email with the handwritten message as an attached encoded GIF file to an external email address for the recipient.

10b. When the recipient opens the email containing the attachment, the message can be displayed on their computer using a GIF viewer.

11a. The IMAP server sends the email with the handwritten message as an attached encoded GIF file to an internal email address, i.e., to an address on a server computer 220 that is running the Handwriting Java Server component 220a.

11b. The Handwriting Java Server decodes the attached GIF file into pixel data and sends it to the Handwriting Java Client applet running in the recipient's web browser.

11c. The Handwriting Java Client receives the pixel data from the Handwriting Java Server and renders the pixel data as a handwritten or handdrawn image in the drawing editor/viewer.

Handwriting Java Client and Domino Server Version

Figure 3A:
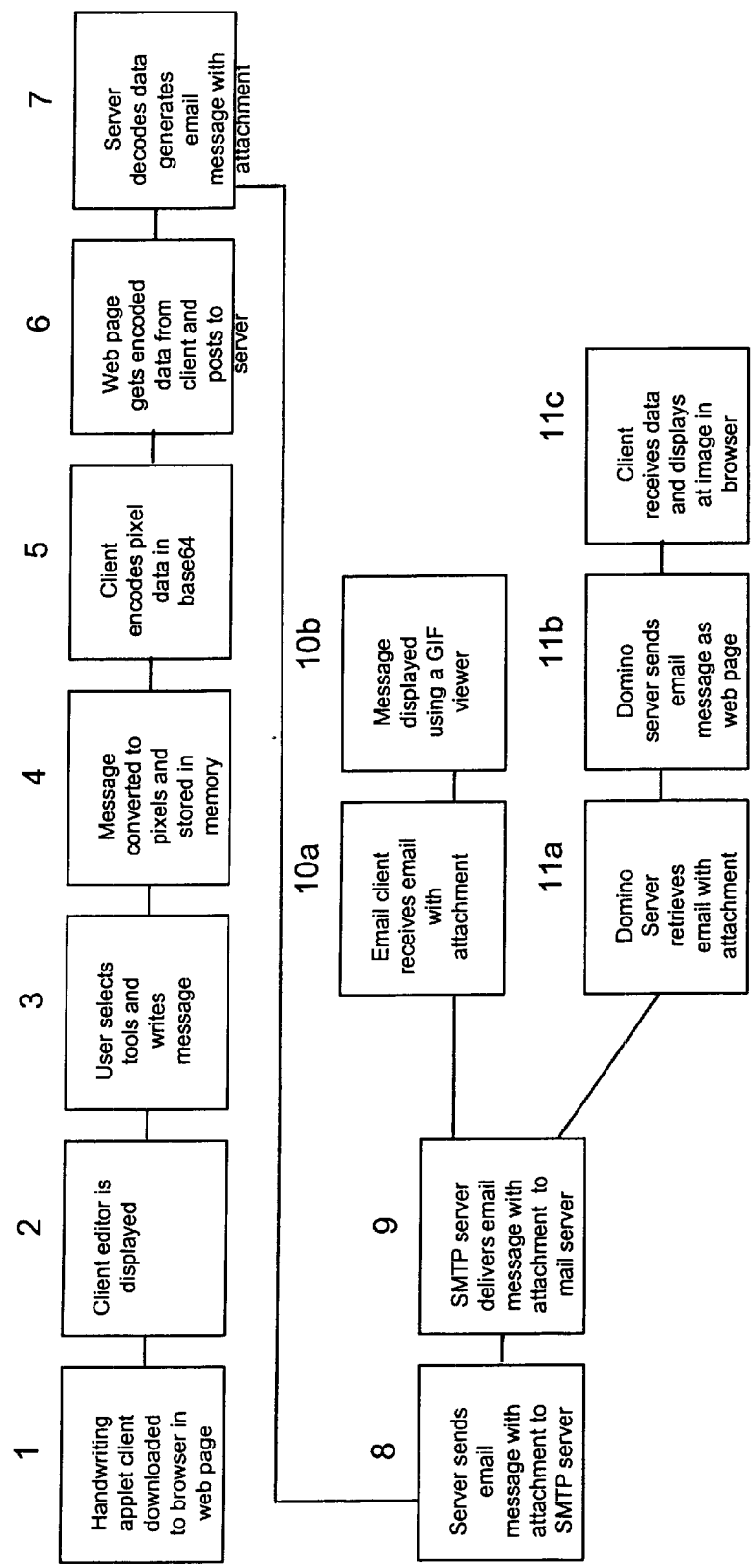
FIG. 3A is a process flow diagram of a Lotus™ Domino server version of the graphical email system.
Figure 3B:
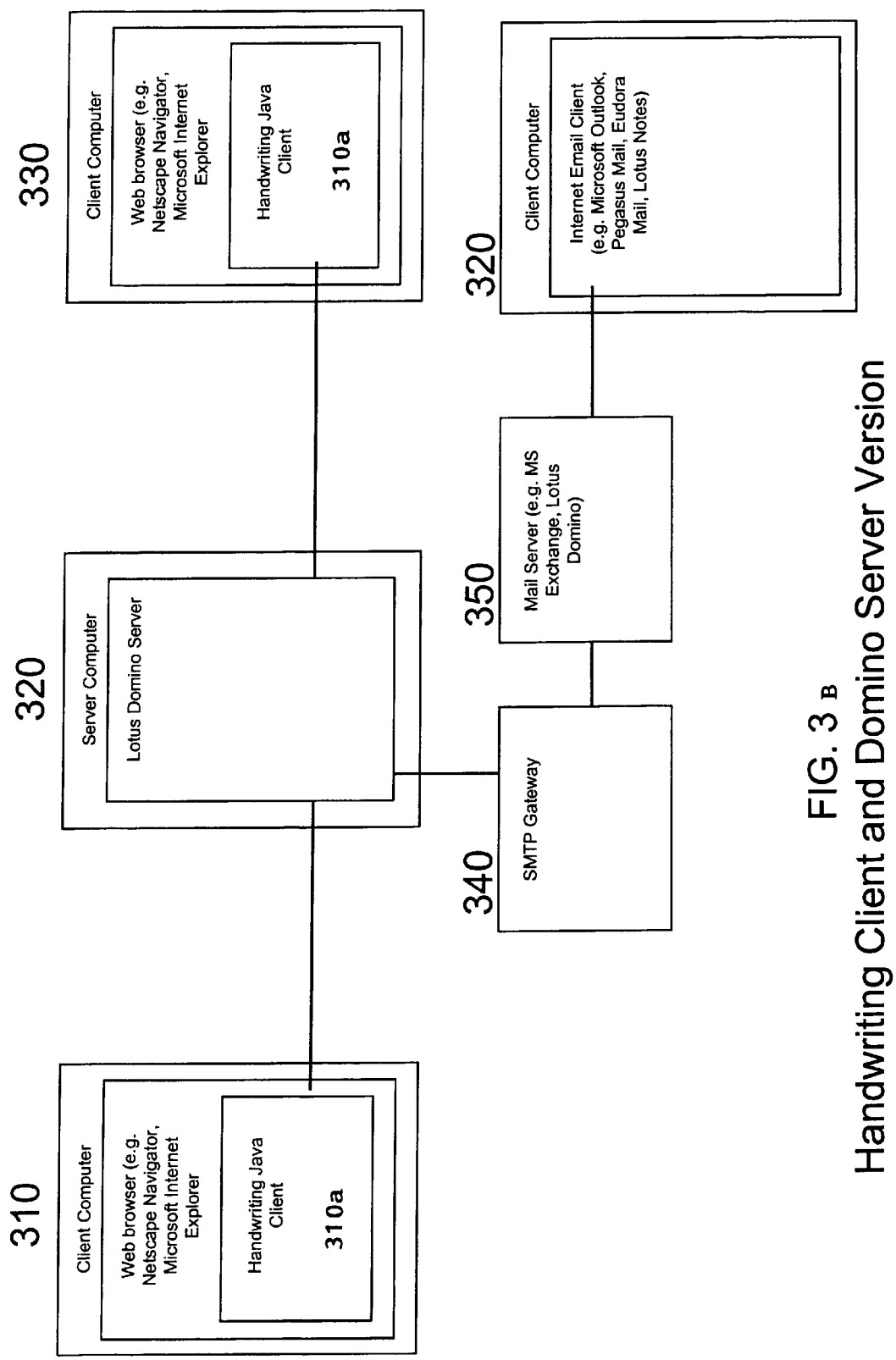
FIG. 3B is a schematic illustration of the network connections of this version of the graphical email system.

With reference to FIG. 3B, this version of the system uses the Handwriting Java Client 310a along with a Lotus™ Domino Server on the server computer 320. As before, the Handwriting Java Client 310a operates in a web browser as a Java applet on the client computers 310,330. The applet 310a provides a drawing editor/viewer to compose and view handwritten messages. For sending and receiving email internally, the applet 310a communicates with the Domino Server on the server computer 320. The Domino server sends email messages among users with client computers running Java client software connected to the server's intranet. The Domino Server communicates with an SMTP email gateway computer 340 to send email messages externally using the SMTP Internet protocol. The SMTP email gateway sends the email messages to mail servers 350 on the Internet. External email recipients can retrieve their graphical email using a standard Internet email client 360. The handwritten drawing can then be viewed as a file attachment using a GIF viewer such as a web browser.

With reference to FIG. 3A, the process steps involved with sending a handwritten email message through a Domino Server and viewing it by the recipient are described in detail below:

1. The Handwriting Java Client software is downloaded from the Handwriting Java Server to the client computer through a web page that is displayed in a web browser.
2. The Handwriting Java Client software is initialized and establishes a connection to the handwriting Domino Server using the TCP/IP and remote method invocation (RMI) protocols. After initialization is complete, the Handwriting Java Client software displays a composition editor that is used to compose the handwritten message.
3. The handwritten message is composed by the user selecting the appropriate writing and drawing tools, colors, and styles.
4. While the user is drawing, the pixel data representing the drawing is captured in the input data area and stored in local memory. The user addresses the email message to a recipient using Javascript fields on the web page in which the Handwriting Java Client is embedded.
5. When the "Send" command is issued, the Handwriting Java Client encodes the pixel data in base64 format.
6. The Web page along with the encoded image is posted to the Domino Server using Javascript.
7. An agent on the Domino Server decodes the image and creates an email message with an attached GIF file.
8. The Domino server sends the email message with attachment to an external recipient's address via an SMTP (Simple Mail Transfer Protocol) gateway.
9. The SMTP gateway transfers the email message to a mail server, which routes the message to the recipient's email box.
10a. an external recipient's e-mail client retrieves the email message with the GIF attachment from an Internet email server.
10b. When the user (recipient of the email) opens the email containing the GIF attachment, the handwritten message in the attachment can be displayed using a GIF viewer.
11a. If the recipient has an internal email address handled by a Domino Server, the server retrieves the email message with the GIF attachment.
11b. The Domino Server sends the email message to the client computer as a web page when the client requests the page via their web browser email client.
11c. The client's web browser email client displays the handwritten message as an image.

Handwriting Java Client and Real Time Server Version

Figure 4:
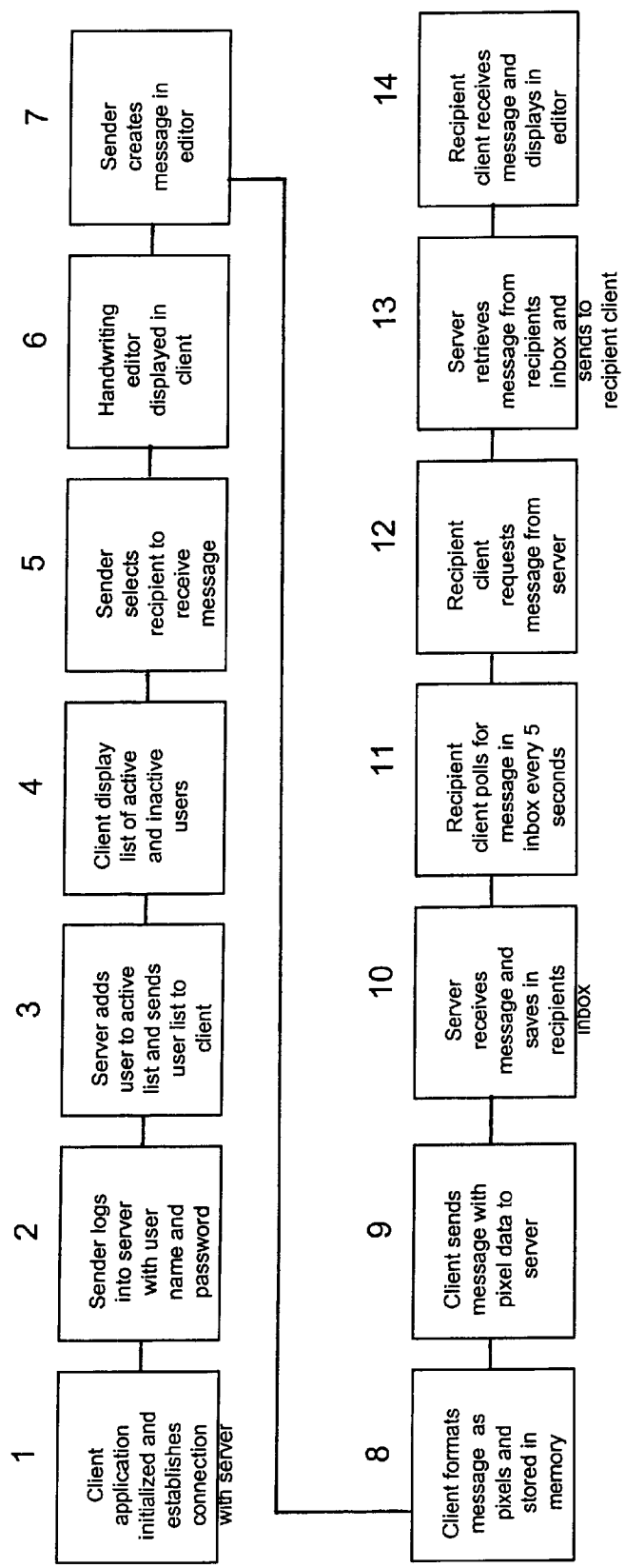
FIG. 4A is a process flow diagram of a real-time messaging server version of the graphical email system.
FIG. 4B is a schematic illustration of the network connections of this version of the graphical email system.
Figure 4B:
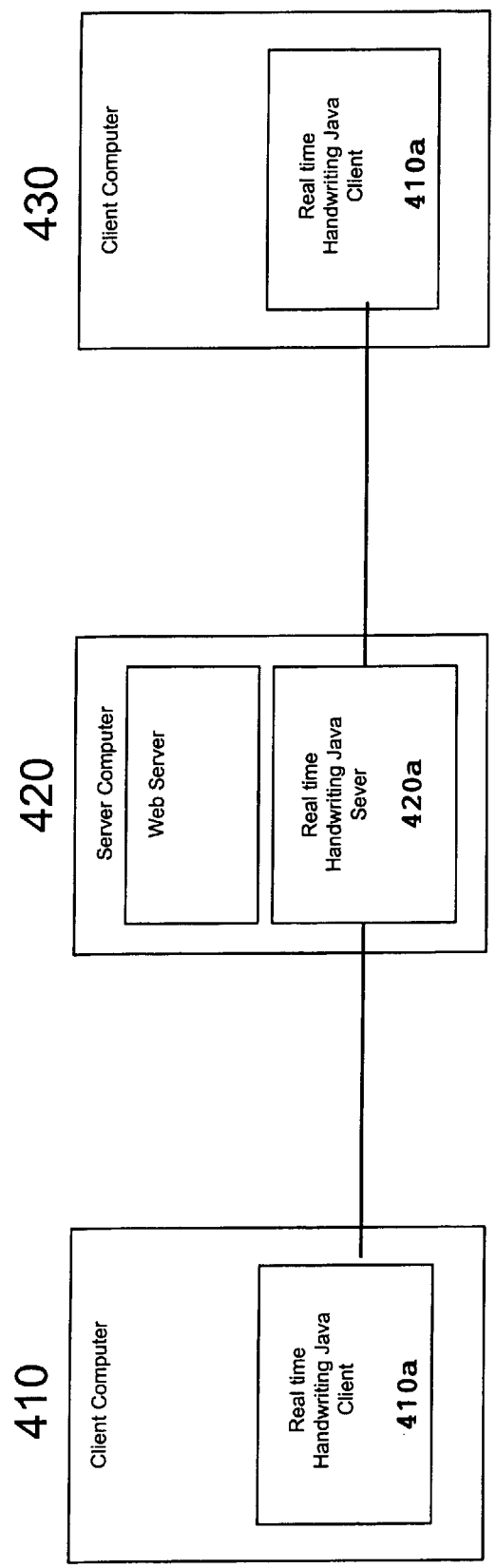

With reference to FIG. 4B, this version of the system uses the Handwriting Java Client with a Real Time Handwriting Java Server. As before, the Handwriting Java Client 410a operates in a web browser as a Java applet on the client computer 410, 430. The applet 410a provides a drawing editor/viewer to compose and view handwritten messages. The applet 410a communicates with the Real Time Java Server component 420a on a server computer 420. The receiving Handwriting Java Client is notified when an email message for that user has been sent to the Real Time Java Server, and retrieves the email message from the server. In this way, communication can take place using the Handwriting Java Client in near real-time. This version is useful for users using mobile communication devices, such as PDAs, WAP-phones, etc.

With reference to FIG. 4A, the process steps involved with sending a handwritten message through a Real-Time Handwriting Java Server and and viewing it by the recipient are described in detail below:

1. The client computer has a downloaded version of the Handwriting Java Client software, and establishes a connection with the server computer on which the Real Time Java Handwriting Server is running.
2. The client computer identifies the user to the server by entering a user name and password.
3. The server maintains a list of registered users, and a list of currently active users. When the client logs onto the server, the server looks up the user name and password in order to authenticate that person as a registered user, then the user is added to the list of active users.
4. The client computer displays a list of active and inactive users which is downloaded from the server.
5. The user clicks on a name from the list of active users to identify the user to whom they want to send a message.
6. After the user selects a name from the list of active users, the handwriting editor is displayed in the Handwriting Java Client.
7. The user creates a message by selecting the appropriate writing and drawing tools, colors, and styles.
8. The Handwriting Java Client formats the message and stores it as pixel data until it is ready to be sent.
9. The completed message is sent to the Real Time Java Handwriting Server in pixel format.
10. The server receives the message and puts it into a repository where it can be retrieved by the user to whom it is addressed.

11. All active client computers poll the repository on the server every five seconds to see if there are any messages for them.
12. When the Handwriting Java Client on the recipient's computer discovers a message in the repository, the client computer requests the message from the server.
13. The server retrieves the message from the repository and sends it to the client computer of the recipient.
14. The recipient's client computer displays the message in the Handwriting Java Client's drawing editor/viewer.

Handwriting Java Client and Internet Email Server Version

Figure 5:
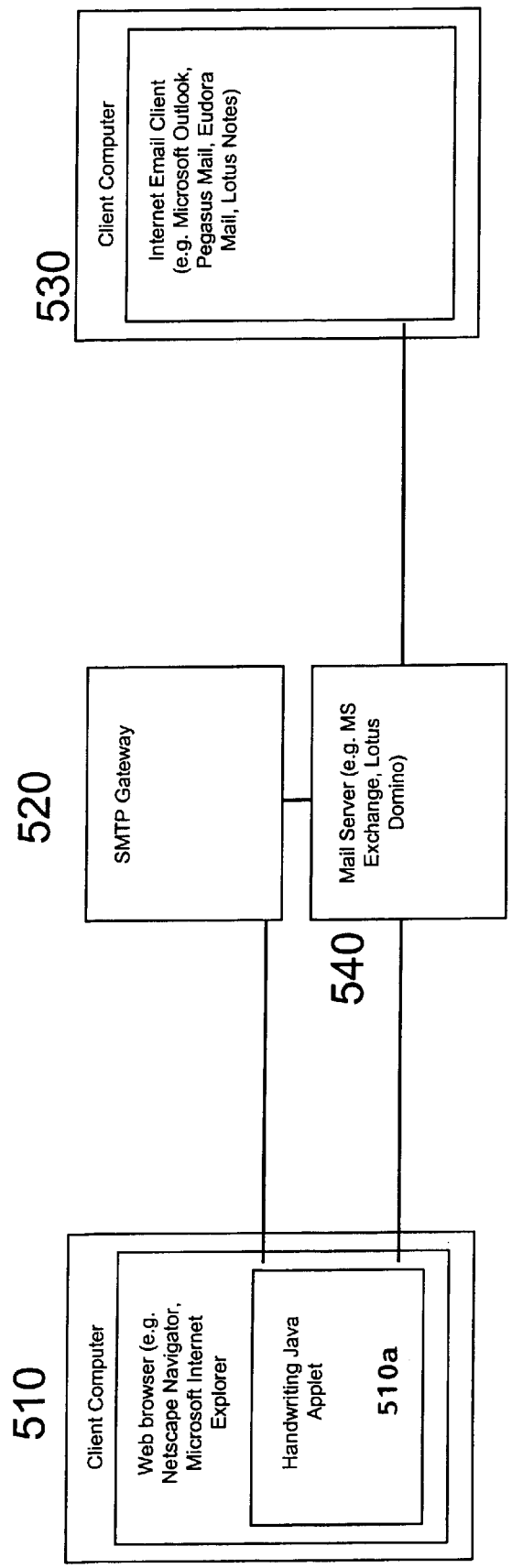
FIG. 5 is a schematic illustration of the network connections of an Internet email server version of the graphical email system.

With reference to FIG. 5, this version of the system uses the Handwriting Java Client along with a standard Internet email mail server. In this version, the Handwriting Java Client is installed as a plug-in to the client computer's web browser and operates as described before, and there is no Handwriting Java Server component. The Handwriting Java Client 510a operates in a web browser as an installed applet on the client computer 510. The applet 510a provides a drawing editor/viewer to compose and view handwritten messages. The Handwriting Java Client formats the message and stores it as pixel data until it is ready to be sent. The message is addressed using Javascript fields on the Web browser form in which the Java applet is embedded. The pixel image is converted into a GIF file and attached to the email message. The Java applet 510a communicates with the Mail Server computer 540 either directly or through an SMTP gateway computer 520. The Mail Server 540 sends the email message with encapsulated GIF image directly to the recipient's client computer 530, and the recipient views the attached GIF file using whatever GIF viewer they have available on their computer.

Handwriting Java Client and Wireless Internet Email Server Version

Figure 6:
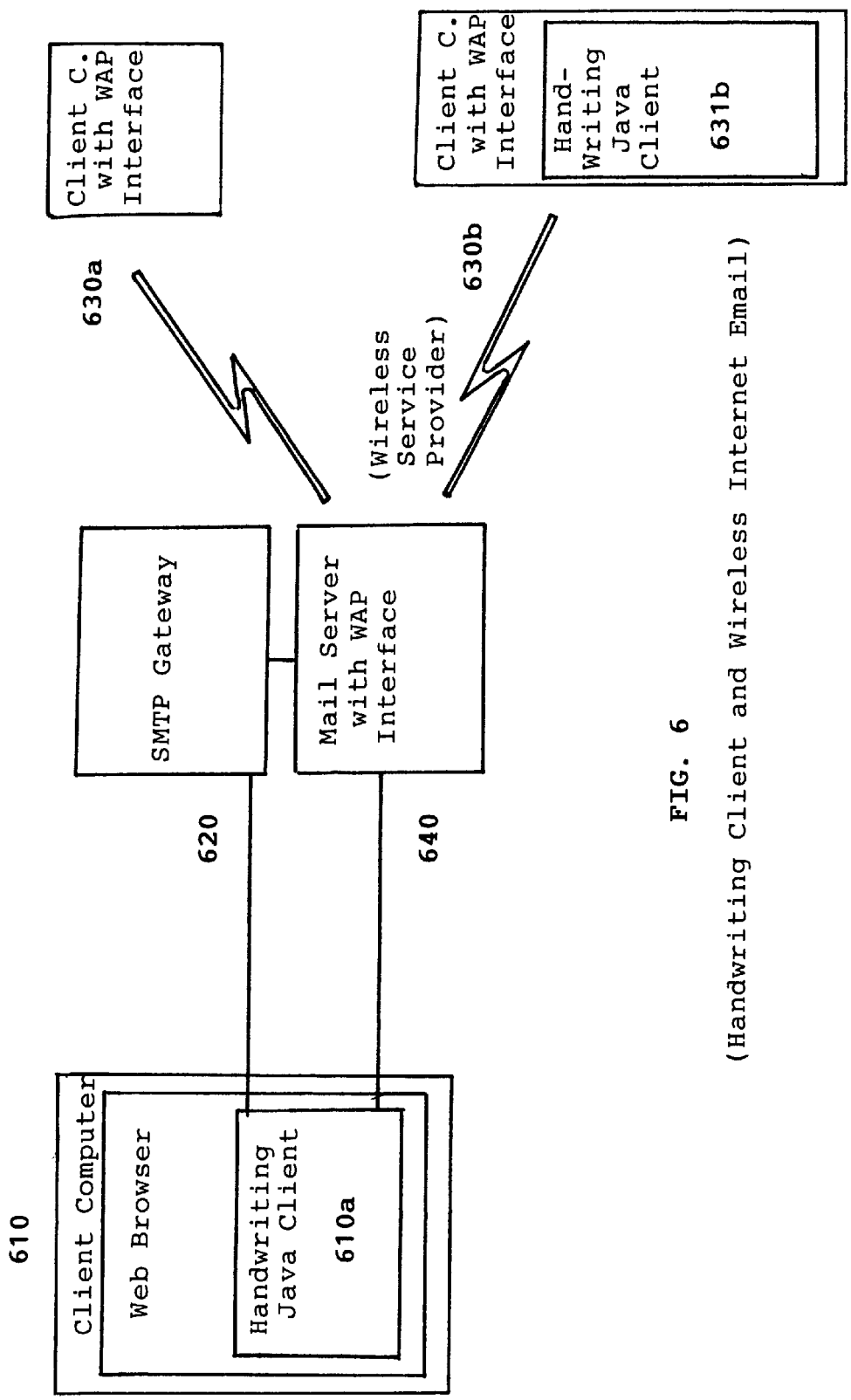
FIG. 6 is a schematic illustration of the network connections of a WAP-enabled cellphone or PDA version of the graphical email system.

With reference to FIG. 6, this version of the system uses the Handwriting Java Client along with a standard Internet email mail server providing email service to wireless client computers, such as WAP-phones and PDAs. As before, the Handwriting Java Client 610a operates in a web browser as an installed Java applet on the client computer 610. The email message is formatted with the handwritten image converted into an attached GIF file. The Java applet 610a communicates with the Mail Server computer 640 either directly or through an SMTP gateway computer 620. The Mail Server 640 includes a Wireless Application Protocol (WAP) interface which sends the email message with encapsulated GIF image through a Wireless Service Provider having WAP handling capability to the recipient.

The recipient's computer can be a thin client 630a such as a digital cellphone with a WAP interface for receiving the email message via Internet and displaying the GIF file via its mini-web browser. Alternatively, the client computer may be a more robust, mobile client computer 630b such as a Palm Pilot™ or similar type of PDA, which has the memory and CPU capacity to have a Handwriting Java Client installed with its web browser and use it for composing and sending handwriting email messages as well as viewing them. The mobile client computer can then use the Handwriting Java Client to format the handwritten message as an attached GIF file (described in the Internet Email Server version) or as pixel data sent with the email for viewing by another client computer having a Handwriting Java Client running in its web browser (as described in the Real-Time Server version).

A handwriting messaging application written for a palm-top or PDA device would currently have to be written in C or C++ because there are no current Java Virtual Machine adaptations that can be used for such devices. However, several efforts are underway to create such Java VM modules for palm-top and PDA devices. Using C/C++ to write full applications on palm-top devices has the current advantage that the security sandbox imposed on Java applets does not exist, thereby allowing a wider variety of messaging applications to be written, as long as actual implementations are kept simple (due to low CPU power and memory storage availability). The handwriting client can be kept simple by including only pen and eraser tools and different line thicknesses. Only palm-top devices with color displays would need a color palette; black and white palm-top devices would dither incoming messages to black and white while sending only two-color images. Since the client is written in C or C++, networking would be limited to standard TCP/IP communications instead of Java's RMI. For communications through a proxy, packets can be wrapped in HTTP and sent through an HTTP proxy. If a handwriting server component is used with the palm-top devices, it would remain largely the same as described above, except that it would handle only standard TCP/IP communications, and would add the ability to receive messaging information wrapped in HTTP packets from behind a firewall.

The functions of the module of the client component which converts and sends the handwritten message for handling as an email message depends upon the configuration of the system. If the system is configured with a Lotus Domino server on a Java VM platform, then the captured handwriting data is sent as a message to the Domino server in the form of a stream of pixel data which is converted by the server to a Graphics Interface Format (GIF) file and appended with an email header to form an email message handled by the server's email service. If the system is configured with a standard type of Internet email server, then the captured handwriting data can be converted at the client computer to a GIF file and sent as an email message to the Internet email server. If the system is configured for real time messaging between client devices, the client device can send the handwritten message as a GIF file appended to standard email, or send it as pixel data to a real-time messaging server which provides real-time messaging service between client devices.

Figure 7A:
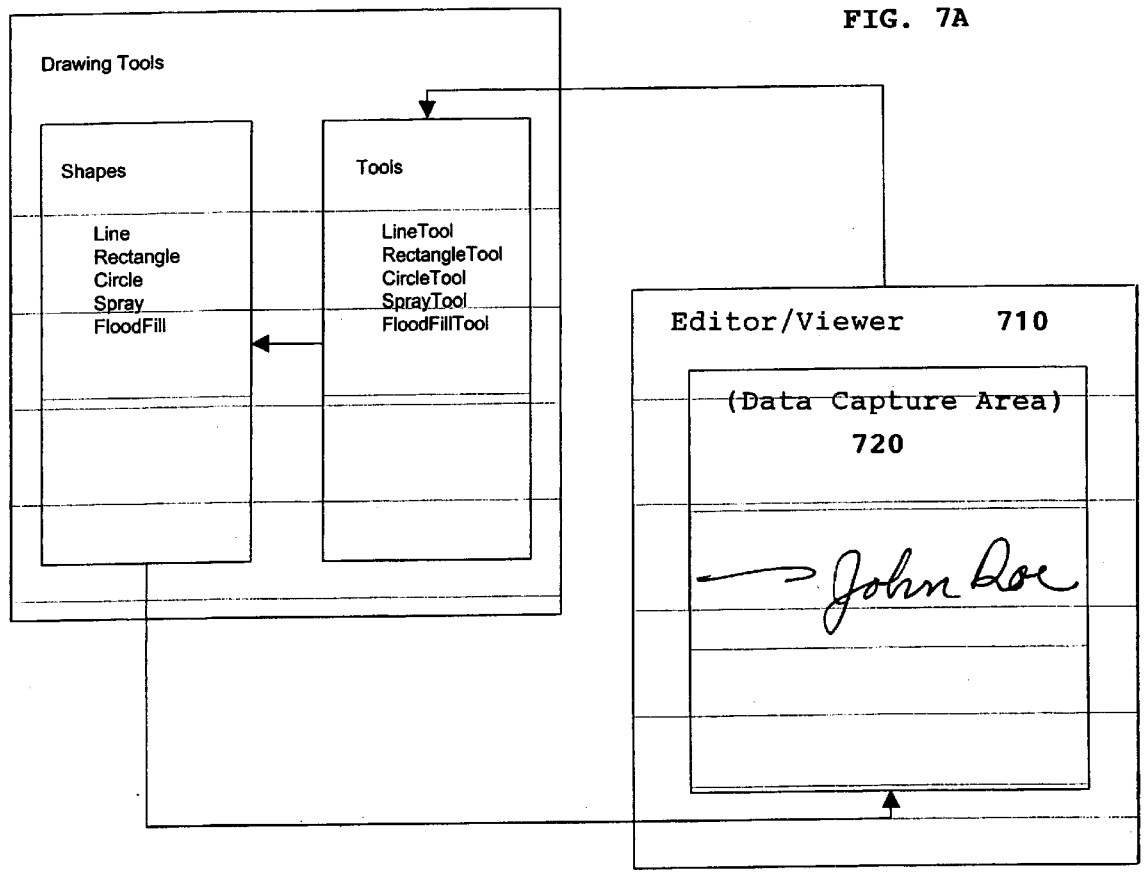
FIG. 7A is a schematic illustration of the user interface for the graphical data capture and drawing functions of the graphical email system.
Figure 7B:
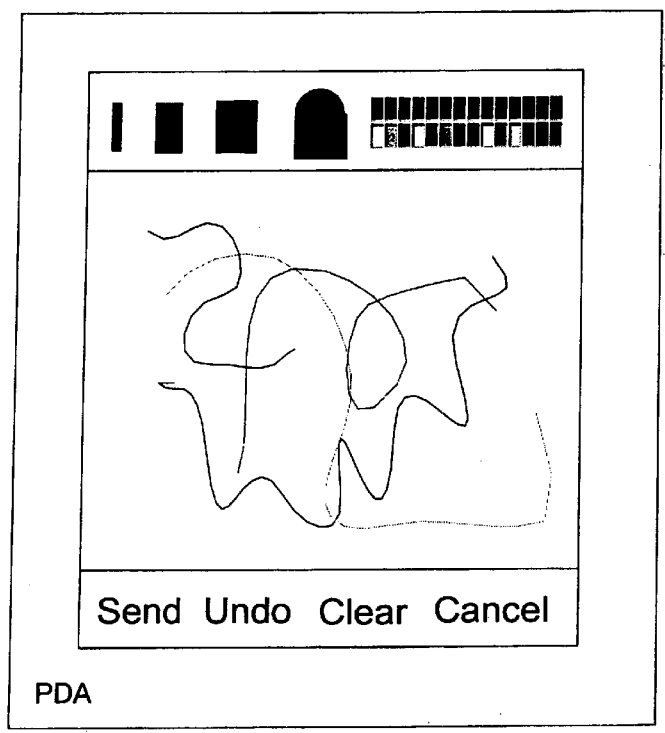
FIG. 7B is an example of an editor/viewer interface for the graphical email system on a personal digital assistant (PDA).

In FIG. 7A, the user interface for the drawing editor/viewer of the Handwriting Java Client is illustrated. For composing a handwritten message, the editor/viewer 710 has a graphical data capture area 720 in which handwritten input can be entered with a touch pen or on a stylus pad and captured as pixel data. The editor/viewer 710 can offer a suite of standard types of drawing tools such as making line, circle, or polygon shapes and spraying and filling image areas. The graphical data capture area 720 is also the graphical image viewing area for email received with an attached GIF file or pixel data. In FIG. 7B, a typical layout for a PDA of the editor/viewer interface with drawing tools and color palette is illustrated.

Handwriting Client and Wireless Real Time Server Version

The version of the system illustrated in FIG. 6 may be modified for real-time messaging between PDAs and mobile communication devices of the "always on" type that are connected to a real-time server through an Internet Wireless Service Provider, rather than a WAP-type phone interface. Examples of "always-on" types of Internet wireless messaging include Research in Motion's (RIM's) BlackBerry™ pager email devices, Motorola Timeport™ P935 Personal Communicator, or the Palm's announced i705 wireless device with always-on access to email.

Similar to the sequence outlined above for the Handwriting Java Client and Real Time Server Version, the always-on wireless messaging device is provided with a handwriting client that sets up a handwriting (e.g., stylus) data capture area in the device to capture the sender's handwriting input and send it as an attachment with a wireless email or message transmission. The wireless service provider employs a real-time server that receives the wireless email or message through the appropriate wireless Internet service interface and routes the message to a private mail or message repository for the intended recipient. If the recipient has an always-on device, the message in that person's private repository is sent to the recipient's device through wireless transmission, where it pops up as a message in the device display. With a handwriting viewer or a mode for viewing attached graphics files, the recipient sees the message instantaneously as handwriting.

The wireless real-time server version allows people to communicate privately and personally by instantly sending handwriting and other graphical data to each other. The handwriting client has utilities to allow a user to maintain an address book of people they wish to communicate with. When the user logs on to the real time server, they are authenticated with a user name and password and are registered as an active user. The handwriting client allows the user to see other users that are currently on-line and to initiate a private, real time communication session with an on-line user. The handwriting client accepts handwritten and other graphical messages, packages the data in a message and sends it to the recipient. The recipient receives an audible notification that they have a message and is able to view the message in their handwriting client. The recipient is also able to reply to the sender by composing a new handwriting message or copying and writing over the original message that was received. This person-to-person communication can continue back and forth, effectively allowing the parties to communicate using handwriting and drawings.

This method of instantly sending handwriting between to parties differ from other real time communication systems such as chat sessions and systems commonly referred to as "electronic whiteboards" and "instant messaging systems" in the following ways.

1. Private message pools for graphical messages: In the invention, graphical messages to be sent to a recipient are stored in the recipient's private message pool and not a shared, common pool. The recipient's client software polls their personal pool and not a common area. This method supports private, one-on-one communications similar to email, except in real time. Chat rooms and whiteboards are intended for group communication and incorporate shared message pools.
2. Graphical handwriting client: The invention allows users to communicate using handwriting input rather than text input. The handwriting client is essentially a graphics input editor implemented in Java which communicates with a real time server. The real time server converts the input data into a real time messaging format that is stored in a repository location and retrieved by the recipient's client.
3. Control over when message is sent: In the invention handwriting messages are composed privately in the handwriting client and sent on demand by the sender, similar to how standard text email is composed locally and sent on demand. Whiteboard systems send graphical data in real time as they are drawn to all users that are viewing the whiteboard.

The wireless real time server version may also be implemented on portable PDA devices and mobile phones that use the Short Messaging Service (SMS) or Enhanced Messaging Service (EMS) for wireless instant messaging on wireless phone service. SMS and EMS now permit graphics attachments to be sent with messages. The handwriting client software can be implemented to run on these mobile devices using a micro or personal Java platform that are becoming available on these devices. The real-time server can correspondingly be adapted with an interface to support handwriting messages sent through the messaging formats used by these mobile messaging devices.

It is understood that many other modifications and variations may be devised given the above description of the principles of the invention. It is intended that all such modifications and variations be considered as within the spirit and scope of this invention, as defined in the following claims.

APPENDIX A

GRAPHICS DATA CAPTURE & SENDING MODULE

```
import java.io.*;
import java.util.*;
import javax.mail.*;
import javax.activation.*;
import javax.mail internet.*;
/**
 * StarMailAgent is called as the form action for a starmail submission form
 * (see, for example, pages/starmailmessage)
 * Note that it is not a web query save agent!
 */
public class StarMailAgent extends HttpAgentBase
{
    protected Session      m_mailSession;
    protected String       m_strHost;
    protected String       m_strSMTP;
    protected String       m_strUser;
    protected String       m_strPassword;
    protected String       m_strAdmin;
    protected boolean      m_bFiltered;
    /**
     * Main entry point for this agent
     *
    ************** THIS IS THE MAIN EMAIL DELIVERY CODE **************
```

APPENDIX A-continued

GRAPHICS DATA CAPTURE & SENDING MODULE

```
 */
public void doPost(HttpAgentRequest _req, HttpAgentResponse _res) {
    // Get mail parameters
    String protocol = "imap" ;
    m_strHost    =    _req.getServerName( ) ;
    m_strSMTP    =    _req.getParameter("SMTPServer") ;
    m_strUser    =    _req.getParameter("From") ;
    m_strPassword =    _req.getParameter ("Password") ;
    m_strAdmin   =    _req.getParameter("Admin") ;
    m_bFiltered  =    _req.getParameter("Filtered").equals ("Yes") ;
    // Establish mail properties and get a session
    Properties props = new Properties( ) ;
    props.put ("mail.imap.host", m_strHost) ;
    props.put ("mail.smtp.host", m_strSMTP) ;
    m_mailSession = Session.getDefaultInstance(props, null) ;
    // Get mail params
    String strTo    =    _req.getParameter("SendTo") ;
    String strSubj  =    _req.getParameter("Subject") ;
    String strBody  =    _req. getParameter ("Body") ;
    String strImage =    _req. getParameter ("Image") ;
    // create and send the message
    try {
        Message msg ;
        if (strImage == null) {
            // Create and send message, and append to the outbox
            msg = createMessage(strTo, strSubj, strBody) ;
        } else {
            msg = createImageMessage(strTo, strSubj, strBody, strImage) ;
        }
        Transport.send (msg) ;
        if (_req.getParameter("Save") .equals ("Yes")) {
            appendMessage(msg, "outbox") ;
        }
    } catch (MessagingException e) {
        _res.setcontentType ("text/plain") ;
        PrintWriter out = _res.getWriter( ) ;
        out.println("Error!") ;
        out.println(m_strHost) ;
        e.printStackTrace(out) ;
    }
    // Redirect to inbox
    String path = _req.getPathInfo( ) ;
    String shortpath = path.substring(0, path.indexOf(".nsf")) ;
    shortpath = shortpath.substring(0, path.indexOf("/") + 1) ;
//      _res . sendRedirect (shortpath + _req.getParameter("MailDB") +
"/$Inbox")
    _res.sendRedirect (shortpath + _req.getParameter("url")) ;
}
/**
 * Given some text, create a mail message out of it suitable for mailing
 * @param _to
 * @param _subj
 * @param _text The message body text
 */
protected Message createMessage(String _to, String _subj, String _text)
throws MessagingException {
    Message msg = new MimeMessage (m_mailSession) ;
    InternetAddress fromAddr = createAddress (m_strUser) ;
    msg.setFrom(fromAddr) ;
    InternetAddress [ ] recip = new InternetAddress [1] ;
    String subject ;
    if (m_bFiltered) {
        recip[0] = createAddress(m_strAdmin) ;
        subject = _subj + "#1#" + _to ;
    } else {
        recip [0] = createAddress(_to) ;
        subject = _subj ;
    }
    msg.setRecipients(Message.RecipientType.TO, recip) ;
    msg.setSubject(subject) ;
    msg.setContent(_text, "text/plain") ;
    return msg ;
}
/**
 * Given some text, create a mail message out of it suitable for mailing
 * @param _to
 * @param _subj
```

APPENDIX A-continued

GRAPHICS DATA CAPTURE & SENDING MODULE

```
 * @param __text The message body text
 * @param __image The image data, encoded as Base64
 */
   protected Message createImageMessage(String __to, String __subj, String __text,
String __image) throws MessagingException {
        Message msg = new MimeMessage(m__mailSession) ;
        InternetAddress fromAddr = createAddress (m__strUser) ;
        msg.setFrom(fromAddr) ;
        InternetAddress [ ] recip = new InternetAddress [1] ;
        String subject ;
        if (m__bFiltered) {
            recip[0] = createAddress(m__strAdmin) ;
            subject = __subj + "#1#" + __to ;
        } else {
            recip[0] = createAddress(__to) ;
            subject = __subj ;
        }
        msg.setRecipients(Message.RecipientType.TO, recip) ;
        msg.setSubject(subject) ;
        // Add the text part
        Multipart mp = new MimeMultipart( ) ;
        MimeBodyPart body1 = new MimeBodyPart( ) ;
        body2.setText(__text) ;
        mp.addBodyPart (body1) ;
        // Add the attachment
        MimeBodyPart body2 = new MimeBodyPart( ) ;
        byte [ ] data = Base64Decoder.decode(__image. toCharArray ( )) ;
        body2.setDataHandler(new DataHandler(data, "image/gif")) ;
        body2.setFileName ("StarMail. gif") ;
        mp.addBodyPart(body2) ;
        msg.setContent(mp) ;
        return msg ;
    }
    /**
     * create an internet address from this string. Basically searches for "@"
and appends
     * "@hostname" if not found
     */
    protected InternetAddress createAddress(String __addr) throws
AddressException {
        if (__addr.indexOf("@") == -1)
            __addr += "@" + m__strHost ;
        return new InternetAddress(__addr) ;
    }
    /**
     * Append the message to the given folder
     * @param __msg The message to append
     * @param __folder The folder to append the message to
     */
    protected void appendMessage (Message __msg, String __folder) throws
MessagingException{
        // Get a Store object
        Store store = m__mailSession.getStore("imap") ;
        store.connect(m__strHost, m__strUser, m__strpassword) ;
        // Open folder (or create it if it doesn't exist)
        Folder dfolder = store.getFolder(__folder) ;
        if (!dfolder.exists ( )) dfolder.create(Folder.HOLDS__MESSAGES) ;
        Message[ ] msgs= { __msg } ;
        dfolder.appendMessages(msgs) ;
        dfolder.close(false) ;
        store.close( ) ;
    }
}
```

I claim:

1. A real-time electronic messaging system comprising:

(a) a server component operable on a server computer on a network with a real-time messaging server for receiving an electronic message sent from a sender and sending it to a recipient to whom it is addressed, (b) a remote client device for the sender connectable to the server computer through an online data connection to the network, and a client component operable on the remote client device for setting up a graphical data capture area in a visual interface of the remote client device, said client component including a graphical input device that is operatively coupled to the graphical data capture area for allowing the user to enter handwritten or handdrawn input through the graphical input device, and for capturing the handwritten or handdrawn input as graphical data and sending it as an electronic message to the server component via the network for sending to the recipient addressed, and (c) at least another remote client device for the recipient connectable to the server computer through an online data connection to the network, having a utility for receiving the electronic message sent to the recipient by the server component and viewing it as a handwritten or handdrawn message.

2. A real-time electronic messaging system according to claim 1, wherein the client component is operable for also setting up a graphical data viewing area for viewing electronic messages with graphical data sent by the server component.

3. A real-time electronic messaging system according to claim 1, wherein the client component is a Java applet installed on the remote client device.

4. A real-time electronic messaging system according to claim 1, wherein the remote client device is an always-on type of wireless Internet messaging device.

5. A real-time electronic messaging system according to claim 1, wherein the remote client device is a mobile phone having an always-on type of wireless Internet messaging component.

6. A real-time electronic messaging system according to claim 1, wherein the client component converts the input graphical data to a graphical data attachment to an email.

7. A real-time electronic messaging system according to claim 1, wherein the client component converts the input graphical data to a graphical data attachment to an instant messaging format.

8. A real-time electronic messaging system according to claim 1, wherein the client component converts the input graphical data to a graphical data attachment to an pager messaging format.

9. A real-time electronic messaging system according to claim 1, wherein the client component converts the input graphical data to a graphical data attachment to an SMS or EMS message.

10. A real-time electronic messaging system according to claim 1, wherein the real-time messaging server routes the electronic message sent from a sender to a private repository for the recipient to whom it is addressed, and polls a remote client device for the recipient to send the electronic message from the recipient's private repository on a real-time basis.

11. A real-time electronic messaging method comprising:

(a) providing a graphical data capture area in a visual interface operable in a client component of a remote client device having an online connection to a network, and a graphical input device operatively coupled to the graphical data capture area for allowing a user to enter handwritten or handdrawn input;

(b) composing an handwritten or handdrawn message on the remote client device for a sender via the graphical data capture area and graphical input device, capturing it as graphical data, and sending it as an electronic message via a network to a server component operable on a server computer; and (c) receiving via a real-time messaging server on the server computer an electronic message sent from a sender and sending it to a remote client device for a recipient to whom it is addressed.

12. A real-time electronic messaging method according to claim 11, wherein the client component is operable for also setting up a graphical data viewing area for viewing electronic messages with graphical data sent by the server component.

13. A real-time electronic messaging method according to claim 11, wherein the client component is a Java applet installed on the remote client device.

14. A real-time electronic messaging method according to claim 11 wherein the remote client device is an always-on type of wireless Internet messaging device.

15. A real-time electronic messaging method according to claim 11, wherein the remote client device is a mobile phone having an always-on type of wireless Internet messaging component.

16. A real-time electronic messaging method according to claim 11, wherein the client component converts the input graphical data to a graphical data attachment to an email.

17. A real-time electronic messaging method according to claim 11, wherein the client component converts the input graphical data to a graphical data attachment to an instant messaging format.

18. A real-time electronic messaging method according to claim 11, wherein the client component converts the input graphical data to a graphical data attachment to an pager messaging format.

19. A real-time electronic messaging method according to claim 11, wherein the client component converts the input graphical data to a graphical data attachment to an SMS or EMS message.

20. A real-time electronic messaging method according to claim 11, wherein the real-time messaging server routes the electronic message sent from a sender to a private repository for the recipient to whom it is addressed, and polls a remote client device for the recipient to send the electronic message from the recipient's private repository on a real-time basis.

\* \* \* \* \*